(12) United States Patent
Czarnecki et al.

(10) Patent No.: US 12,113,341 B2
(45) Date of Patent: Oct. 8, 2024

(54) POWER INLET BOX WITH CIRCUIT PROTECTION

(71) Applicant: Reliance Controls Corporation, Racine, WI (US)

(72) Inventors: Neil A. Czarnecki, Mount Pleasant, WI (US); Curtis N. Kell, Burlington, WI (US); Benjamin F. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 192 days.

(21) Appl. No.: 17/978,663

(22) Filed: Nov. 1, 2022

(65) Prior Publication Data

US 2024/0146043 A1    May 2, 2024

(51) Int. Cl.
*H02G 3/08* (2006.01)
*H01H 13/14* (2006.01)

(52) U.S. Cl.
CPC ............ *H02G 3/083* (2013.01); *H01H 13/14* (2013.01)

(58) Field of Classification Search
None
See application file for complete search history.

(56) References Cited

U.S. PATENT DOCUMENTS

| | | | | |
|---|---|---|---|---|
| 4,767,359 A * | 8/1988 | Martell | ................. | H01R 13/713 439/654 |
| 5,895,981 A * | 4/1999 | Flegel | ..................... | H02B 1/50 307/64 |
| 5,984,719 A * | 11/1999 | Flegel | ................. | H01R 13/5202 439/535 |
| 6,293,821 B1 * | 9/2001 | Flegel | ..................... | H02B 1/50 439/535 |
| 6,674,031 B1 * | 1/2004 | Flegel | .................. | H01R 13/713 174/53 |
| 7,766,695 B1 * | 8/2010 | Czarnecki | ............ | H01R 13/447 174/67 |
| 7,909,642 B1 * | 3/2011 | Czarnecki | ............ | H01R 25/006 439/535 |
| D648,282 S * | 11/2011 | Czarnecki | ..................... | D13/152 |
| 8,288,651 B2 * | 10/2012 | Smith | ................. | H01R 13/5205 174/53 |
| 8,310,818 B1 * | 11/2012 | Czarnecki | ................ | H02B 1/50 361/647 |
| 8,344,250 B2 * | 1/2013 | Padro | ..................... | H01H 83/02 174/53 |
| 8,415,561 B2 * | 4/2013 | Gates | ................... | H01R 13/748 174/59 |

(Continued)

OTHER PUBLICATIONS

Reliance Controls, installation manual for reliance power inlet cat. No. PR30., Feb. 15, 2005.

*Primary Examiner* — Krystal Robinson
(74) *Attorney, Agent, or Firm* — Wong Meyer Smith & McConnell (57) ABSTRACT

A power inlet box has as housing with sidewalls and a bottom wall that define an interior. A socket is secured to the housing, to enable power from a power source to be provided to the power inlet box. Circuit breakers are secured to the bottom wall for providing overload protection in the power inlet box. Each circuit breaker includes a reset button located below the bottom wall within a recess defined by the housing.

23 Claims, 7 Drawing Sheets

(56) References Cited

U.S. PATENT DOCUMENTS

| | | | | |
|---|---|---|---|---|
| 8,455,759 B2* | 6/2013 | Mortun | ................... | H02G 3/088 |
| | | | | 174/67 |
| 8,563,883 B1* | 10/2013 | Flegel | ..................... | H02B 1/48 |
| | | | | 200/50.02 |
| 8,885,328 B1* | 11/2014 | Czarnecki | ................ | H02B 1/42 |
| | | | | 361/652 |
| 9,276,346 B1* | 3/2016 | Czarnecki | ............ | H01R 13/447 |
| 11,264,769 B1* | 3/2022 | King | ................... | H01R 33/945 |
| 2008/0179072 A1* | 7/2008 | Drane | ..................... | H02G 3/14 |
| | | | | 174/67 |
| 2013/0133916 A1* | 5/2013 | Colquhoun | .............. | H01H 9/02 |
| | | | | 174/53 |
| 2017/0093146 A1* | 3/2017 | Gao | ....................... | H02H 3/335 |
| 2017/0237247 A1* | 8/2017 | Jonas | ...................... | G10K 1/26 |
| | | | | 174/53 |
| 2018/0316141 A1* | 11/2018 | Clark | .................... | H01R 13/73 |

* cited by examiner

POWER INLET BOX WITH CIRCUIT PROTECTION

BACKGROUND OF THE INVENTION

This invention relates to a power inlet box, such as for use in connecting an electrical power generator or other alternate power source to electrical circuitry within a building, and more particularly to a power inlet box with circuit protection to prevent overloading of the electrical circuitry within a building.

BRIEF SUMMARY OF THE INVENTION

It is known to connect a power inlet box into the electrical circuitry of a building or other structure. The power inlet box provides a means for supplying electrical power to the building's electrical circuitry from an electrical generator or other alternate power source, such as during a power outage when the primary source of electrical power to the building is unavailable.

A prior art metal power inlet box is provided with circuit breakers that are accessible from a front wall of the metal power inlet box. The circuit breakers prevent an electrical power overload from the generator to the building's electrical circuitry. The circuit breakers are accessible via a flip lid that is secured to the front wall of the metal power inlet box. While this construction is satisfactory, it entails the potential for moisture from rain, snow or ice to make its way through the flip lid and into contact with the circuit breakers.

In accordance with the present invention, a power inlet assembly for securement to a structure includes a housing having a series of sidewalls, a top wall and a bottom wall that cooperate to define an interior. A power inlet member is secured to the housing, and is configured to receive a power receptacle in order to enable power from a power source to be provided to the power inlet assembly. One or more overload protection members are mounted to the bottom wall of the housing. The overload protection members are configured to be electrically interconnected between the power inlet member and an electrical system associated with the structure. Each overload protection member includes a reset component that is accessible from below the bottom wall of the housing.

Each overload protection member may be in the form of a circuit breaker secured to the bottom wall, and the reset component of each circuit breaker may be in the form of a reset button. The sidewalls and the bottom wall of the housing cooperate to define a downwardly facing recess within which each reset button is located. The sidewalls extend downwardly to a location past the lowermost extent of each reset button so as to protect the circuit breakers from exposure to atmospheric moisture.

In one embodiment, the bottom wall and the sidewalls are interconnected together so as to prevent removal of the bottom wall from the sidewalls. In another embodiment, the bottom wall and the sidewalls are configured such that the bottom wall can be selectively removed from and engaged with the sidewalls, with the circuit breakers being movable along with the bottom wall relative to the sidewalls.

Other aspects, Objects, features and advantages of the invention will become apparent to those skilled in the art from the following detailed description and accompanying drawings. It should be understood, however, that the detailed description and specific examples, while indicating preferred embodiments of the present invention, are given by way of illustration and not limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions and instruments shown. Like numerals indicate like elements throughout the drawings. In the drawings.

While the invention is described here in in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION

Figure 1:
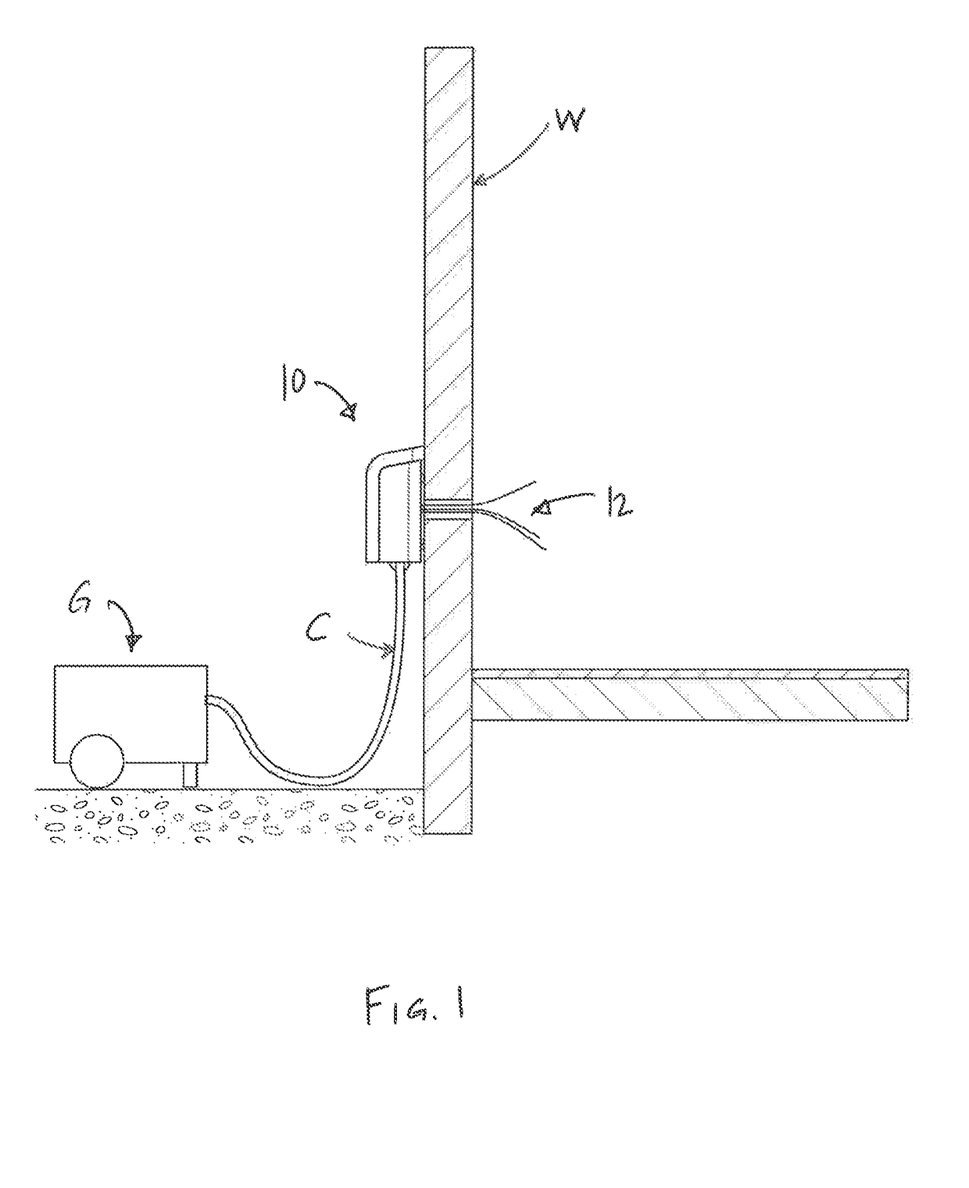
FIG. 1 is a side elevation view, partially in section, showing an application of a first embodiment of a power inlet box with circuit protection in accordance with the present invention.

As shown in FIG. 1, a system for providing power to a structure having a wall W includes a power inlet box 10 in accordance with the present invention, which may be secured to the outside surface of the wall W. In a manner as is known, a source of electrical power, such as a backup generator G, may be interconnected with the power inlet box 10 via an electrical power cord C. The power cord C terminates in a power receptacle that can be selectively engaged with the power inlet box 10, and power to the structure is supplied through the power inlet box 10 to the electrical system of the structure via electrical wiring, representatively illustrated at 12. The electrical wiring 12 is typically connected inside the structure to an electrical panel, in a manner as is known, so that electrical power can be supplied from the backup generator G through the power inlet box 10 to the electrical panel of the structure.

Figure 2:
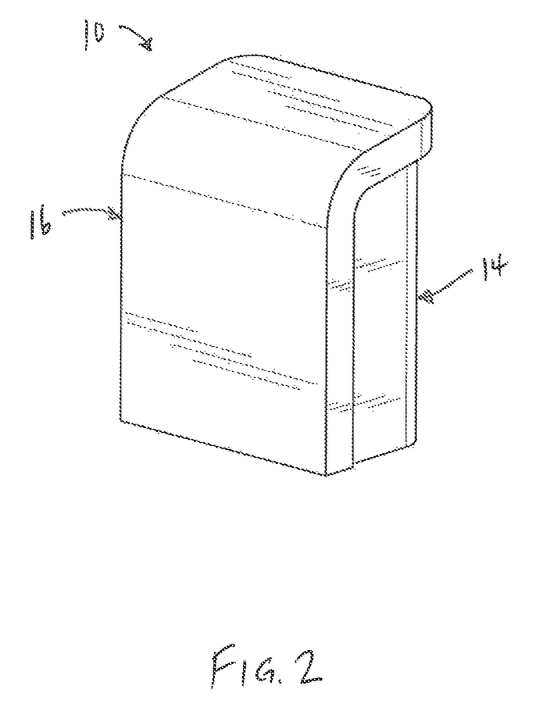
FIG. 2 is an isometric view of the power inlet box with circuit protection as shown in FIG. 1.

As shown in FIG. 2, the power inlet box 10 may be of the type having a base 14 configured for securement to the wall W, in combination with a cover 16 that encloses the base 14. A power inlet box of this type is shown and described in Czarnecki et al. U.S. Pat. No. 7,766,695 issued Aug. 13, 2010, the entire disclosure of which is hereby incorporated by reference, and is commercially available from Reliance Controls Corporation of Racine, Wisconsin under its model numbers PRN20, PIIN30 and PBN50.

Figure 3:
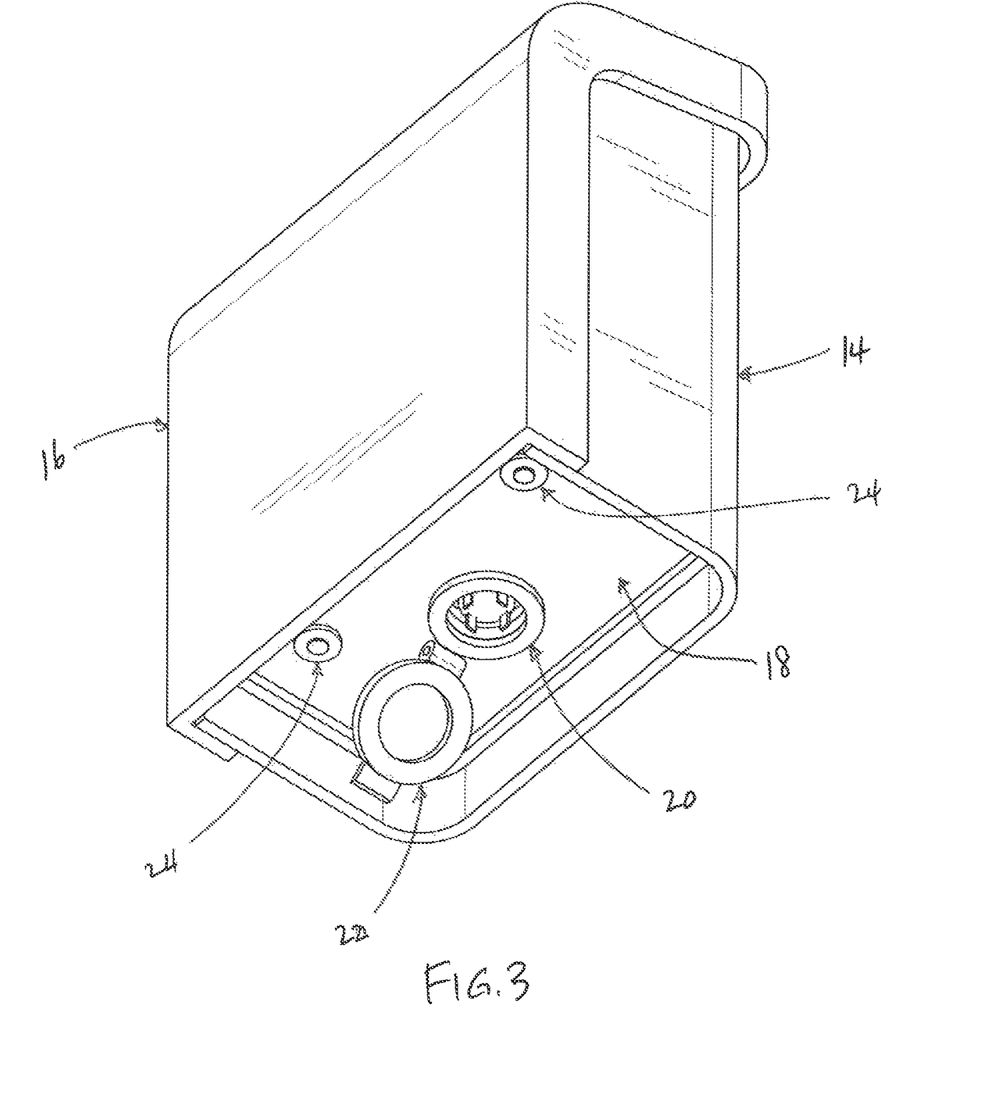
FIG. 3 is a bottom isometric view of the power inlet box with circuit protection as shown in FIG. 2.
Figure 4:
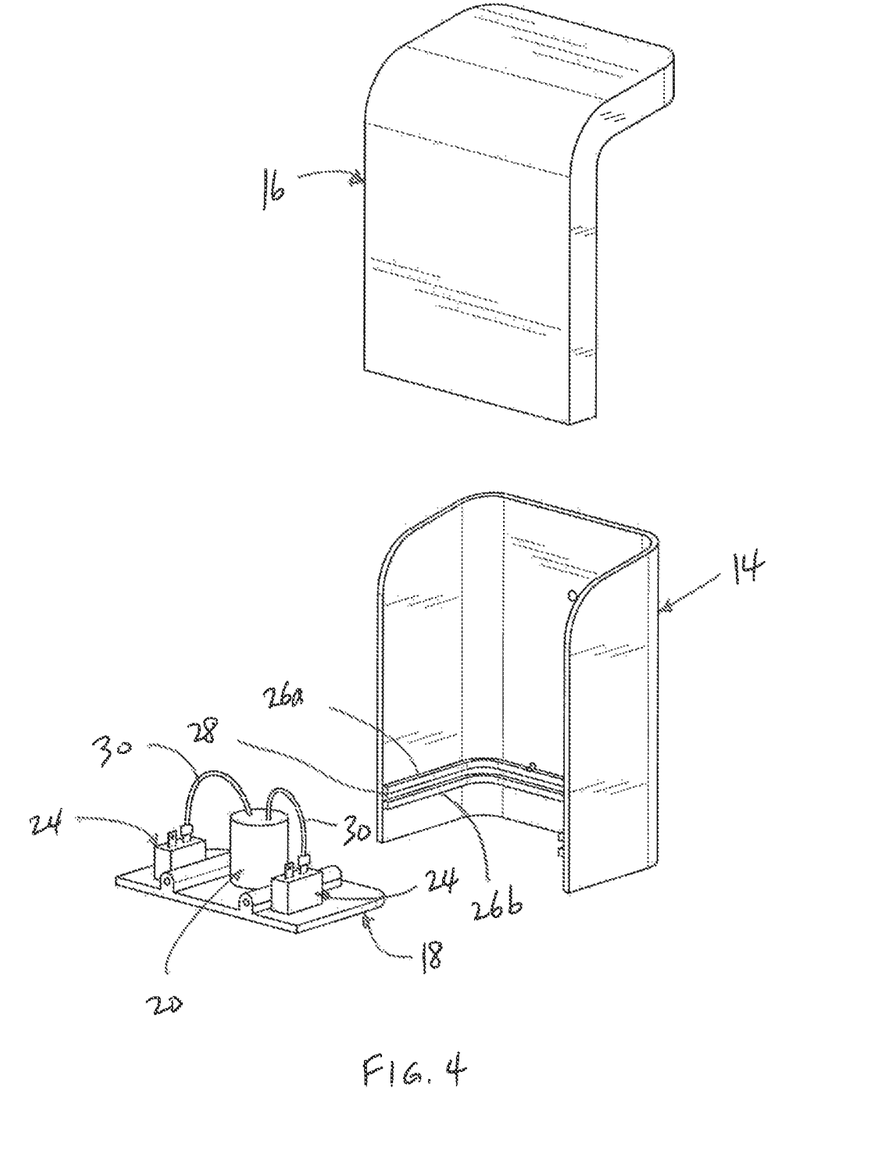
FIG. 4 is an exploded isometric view of the power inlet box with circuit protection as shown in FIGS. 2 and 3.

Referring to FIGS. 3 and 4, the power inlet box 10 further includes a bottom wall 18, which functions to define the lower extent of an internal cavity formed by base 14 and cover 16 when they are secured together. Representatively, the base 14, cover 16 and bottom wall 18 may be formed of a thermoplastic material using a process such as injection molding, although it is understood that any satisfactory material and forming method may be employed. A power inlet member in the form of a socket 20 is mounted to bottom wall 18. A power receptacle at the end of the electrical cord C is engageable with the socket 20, in a manner as is known, to provide electrical power to the power inlet box 10 from the backup generator G. The socket 20 may be provided with a flip lid 22, for selectively covering the contacts and socket cavity when the socket 20 is not in use.

In accordance with the present invention, the power inlet box 10 may be provided with circuit protection in order to prevent excessive electrical current from passing through power inlet box 10 to the electrical circuitry of the structure to which the power inlet box 10 is secured. The circuit protection is provided by one or more circuit breakers incorporated into power in the box 10. In the illustrated embodiment, the circuit breakers are shown as a pair of circuit breakers 24, which are secured to the bottom wall 18 of the power inlet box 10.

Figure 5:
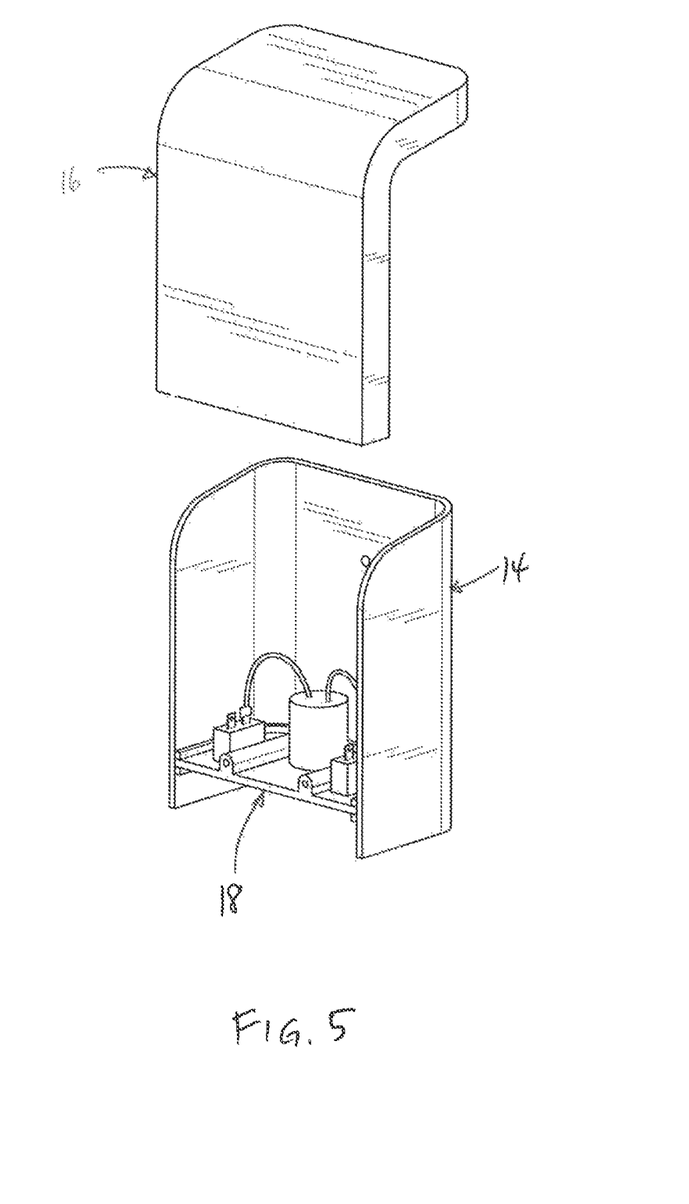
FIG. 5 is a partially assembled isometric view of the power inlet box with circuit protection as shown in FIGS. 2-4.

As shown, the base 14 of the power inlet box 10 may be provided with a pair of spaced apart internal ridges 26a, 26b, between which a channel 28 is defined. Bottom wall 18 is configured such that it can be assembled to base 14 by engagement of its side and rear edges within the channel 18, as shown in FIG. 5. With this construction, the socket 20 and circuit breakers 24 can be preassembled to the bottom wall 18, forming a subassembly that can be assembled to base 14 and then enclosed by cover 16 when it is secured to base 14, in a manner as is known. Each circuit breaker 24 includes an internal portion that is electrically connected with the power inlet member within the interior of the housing, and the circuit breaker reset button comprises an external portion of the circuit breaker that is accessible from the exterior of the housing. Appropriate wires 30 may be connected between socket 20 and each circuit breaker 24, such as via female connectors at the end of each wire 30 that can be engaged with a male connector on the circuit breaker 24. It is understood, of course, that any other satisfactory means of electrically interconnecting the socket 20 with the circuit breakers 24 may be employed. With this configuration, wiring from the structure's electrical system can be routed into the interior of the power inlet box 10, in a manner as is known, and engaged with connectors on the circuit breakers 24 to supply a path for electrical power from the socket 20 to the structure's electrical system.

With the configuration as shown and described, the circuit breakers 24 are positioned so that the reset button of each circuit breaker 24 faces downwardly from the outside surface of the power inlet box bottom wall 18. The front wall of the cover 16, and the side walls of base 14, extend downwardly past the lower surface of the bottom wall 18 in an amount sufficient to protect the circuit breaker reset buttons against exposure to rain, snow, ice or other adverse elements. Even though protected, the circuit breaker reset buttons are easily accessible in the event either or both of circuit breakers 24 is tripped by the supply of excessive electrical current to the power inlet box 10.

Figure 6:
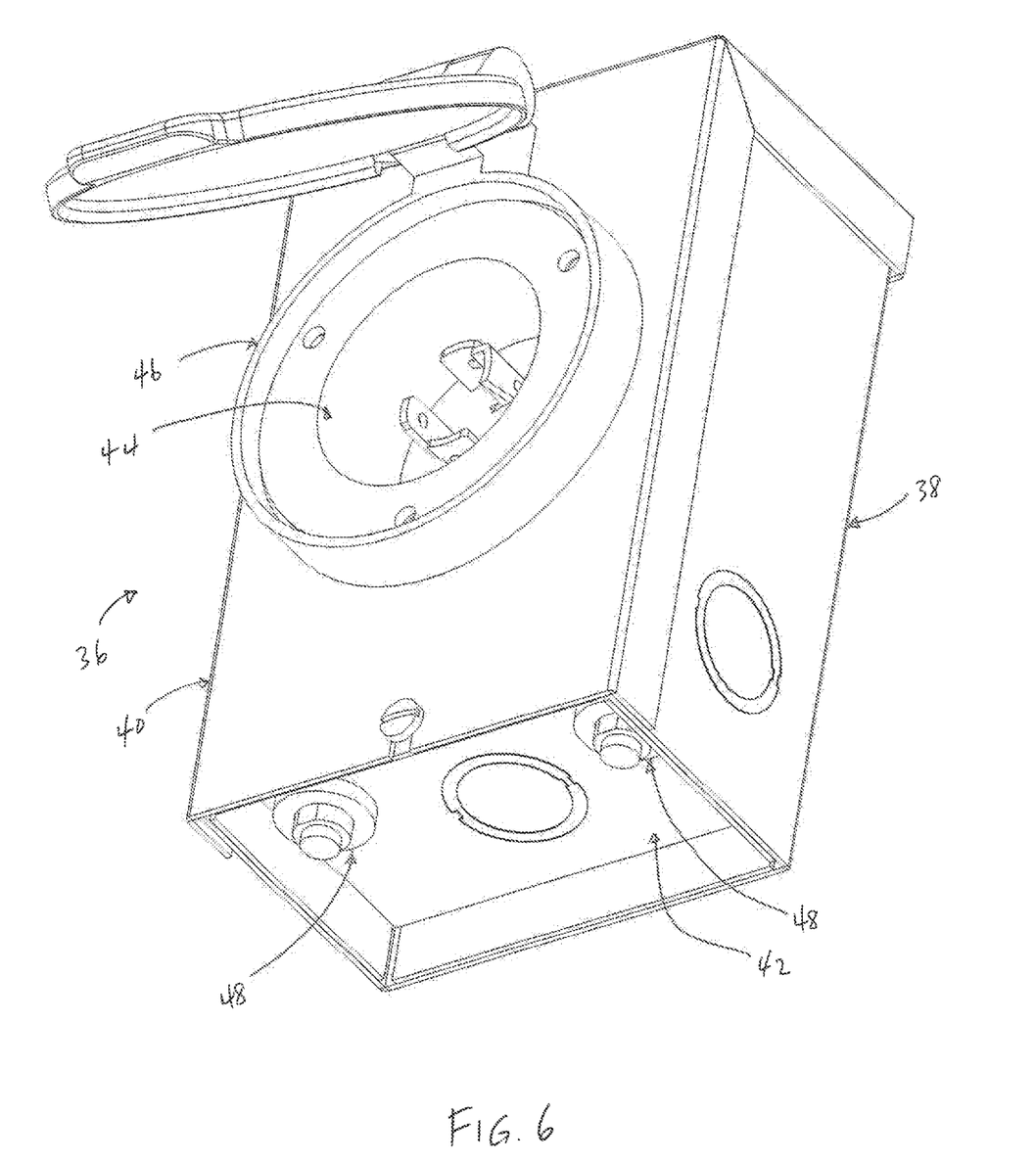
FIG. 6 is a bottom isometric view of a second embodiment of a power inlet box with circuit protection in accordance with the present invention.
Figure 7:
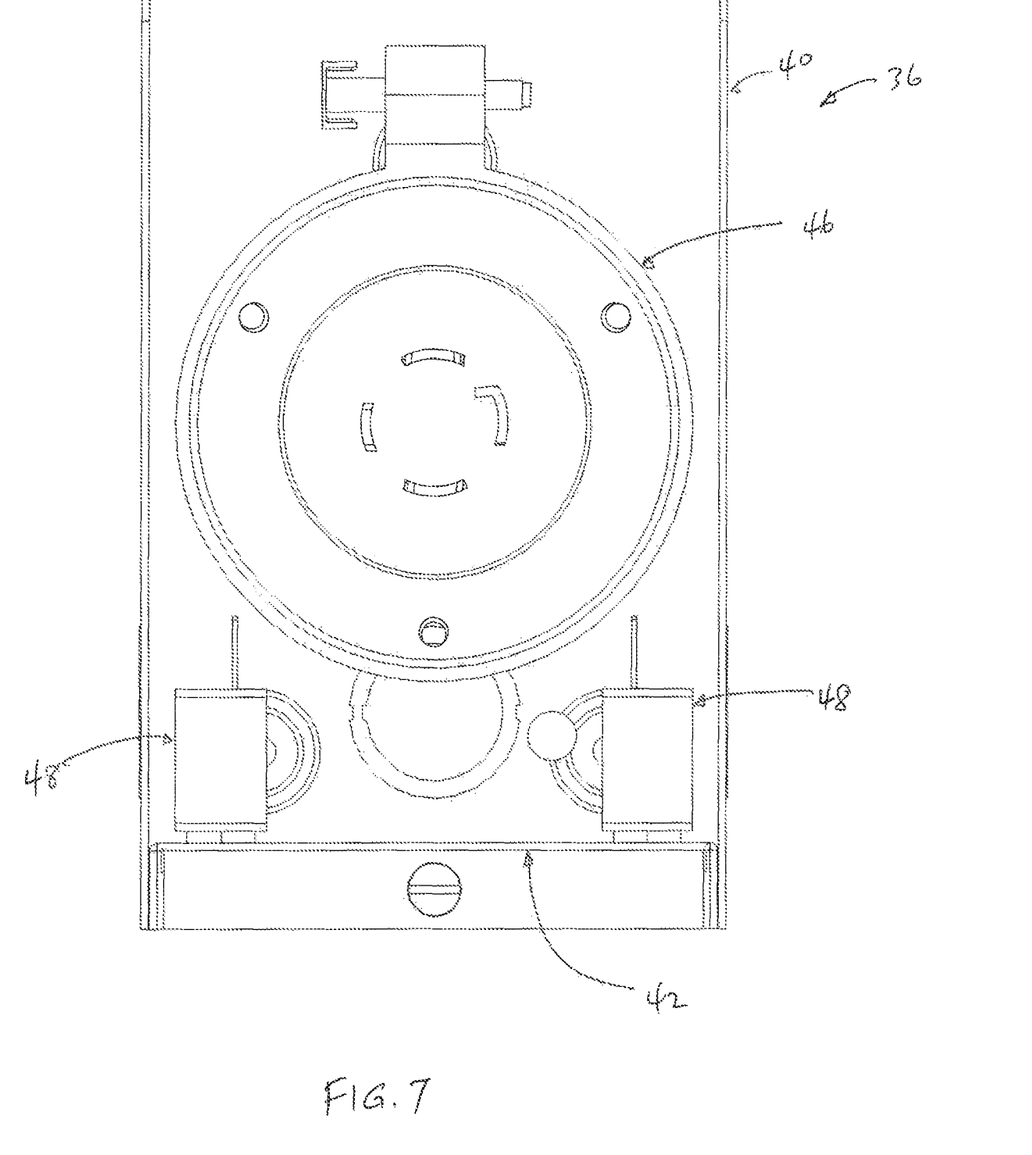
FIG. 7 is a front elevation view of the power inlet box of FIG. 6 with the cover removed so as to expose the internal components thereof.

FIGS. 6 and 7 illustrate another embodiment of a power inlet box, shown at 36, in accordance with the present invention. FIG. 6 illustrates the power inlet box 36 in a bottom isometric view. FIG. 7 illustrates the power inlet box 36 with its front cover removed, so as to illustrate the components contained within the interior of power inlet box 36.

In a manner similar to the previously-described power inlet box 10, the power inlet box 36 includes a base 38 and a cover 40. In this embodiment, however, the base 38 and cover 40 are formed of sheet metal components that are cut, bent and welded (or otherwise connected) to the desired configurations. In a version such as this, the base 38 includes a bottom wall 42 that is secured in place on the base 38. That is, in contrast to the separate nature of bottom wall 18 of power inlet box 10, which can be selectively engaged with or removed from the base 14, the bottom wall 42 of power in the box 36 is fixed in position and cannot be disengaged or removed from the base 38. In a manner as is known, the cover 40 is selectively engageable with the base 38 so as to cooperate with base 38 and bottom wall 42 to define an interior within which electrical wiring and connections are contained.

While the drawings illustrate the base 38, cover 40 and bottom wall 42 as being formed of sheet metal, it is understood that a hybrid construction may also be employed in which base 38 is formed of sheet metal and cover 40 is formed of a thermoplastic material, or in which base 38 is formed of a thermoplastic material and cover 40 is formed of sheet metal. In the latter, the base may be provided with a separate bottom wall as shown and described in connection with power inlet box 10.

In a manner as is known, power inlet box 36 includes a socket 44 secured to the front wall of cover 40. A flip lid assembly 46 is provided for selectively enclosing the socket 44 in order to protect it from the elements. Alternatively, the power inlet box 36 may be constructed with the socket 44 secured to the bottom wall 42.

In the illustrated embodiment, the power inlet box 36 is provided with circuit protection in the form of a pair of circuit breakers 48 that are secured to the bottom wall 42. As in the previously-illustrated embodiment, the circuit breakers 48 are wired between the socket 44 and the electrical system of the structure to which the power inlet box 36 is secured, in order to prevent the structure's electrical system from being exposed to excessive current. The reset buttons of the circuit breakers 48 faced downwardly and are accessible from below the bottom wall 42, which provides easy access in the event the circuit breakers 48 need to be reset. The bottom portion of the front wall of cover 40 extends downwardly past the lower extent of the circuit breaker reset buttons, as do the bottom portions of the back wall and sidewalls of the base 38. In this manner, the circuit breakers 48 are contained within a downwardly facing recess and are protected against exposure to the elements.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed, and defined herein, extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

The invention claimed is:

1. A power inlet assembly for securement to a structure, comprising:
   a housing having a series of sidewalls, a top wall and a bottom wall that cooperate to define an interior;
   a power inlet member secured to the housing, wherein the power inlet member is configured to receive a power receptacle in order to enable power from a power source to be provided to the power inlet assembly; and
   one or more overload protection members mounted to the bottom wall of the housing, wherein the overload protection members are configured to be electrically interconnected between the power inlet member and an electrical system associated with the structure, wherein each overload protection member includes a reset component that is accessible from below the bottom wall of the housing.

2. The power inlet assembly of claim 1, wherein each overload protection member comprises a circuit breaker secured to the bottom wall, wherein the reset component of each circuit breaker comprises a reset button.

3. The power inlet assembly of claim 2, wherein the power inlet member is secured to the bottom wall along with the one or more overload protection members.

4. The power inlet assembly of claim 2, wherein the sidewalls and the bottom wall cooperate to define a downwardly facing recess within which each reset button is located.

5. The power inlet assembly of claim 4, wherein the sidewalls extend downwardly to a location past the lowermost extent of each reset button so as to protect the circuit breakers from exposure to atmospheric moisture.

6. The power inlet assembly of claim 4, wherein the bottom wall and the sidewalk are interconnected together so as to prevent removal of the bottom wall from the sidewalk.

7. The power inlet assembly of claim 4, wherein the bottom wall and the sidewalls are configured such that the bottom wall can be selectively removed from and engaged with the sidewalls, wherein the circuit breakers are movable along with the bottom wall relative to the sidewalk.

8. A power inlet assembly for securement to a structure, comprising:
   a housing having a series of walls that cooperate to define an interior, wherein the series of walls includes a downwardly facing wall;
   a power inlet member secured to the housing, wherein the power inlet member is configured to receive a power receptacle that enables power from a power source to be provided to the power inlet assembly; and
   one or more circuit breakers secured to the downwardly facing wall, wherein the circuit breakers are configured to be electrically interconnected between the power inlet member and an electrical system associated with the structure, wherein each circuit breaker includes a reset button located below the downward facing wall.

9. The power inlet assembly of claim 8, wherein each circuit breaker includes an internal portion that is electrically connected with the power inlet member within the interior of the housing, and wherein the circuit breaker reset button comprises an external portion of the circuit breaker that is accessible from the exterior of the housing.

10. The power inlet assembly of claim 9, wherein the circuit breaker reset buttons are positioned within a downwardly-facing recess.

11. The power inlet assembly of claim 10, wherein the downwardly-facing recess is defined by the downwardly-facing wall in combination with lower portions of a series of sidewalls defined by the housing.

12. The power inlet assembly of claim 9, wherein the downwardly facing wall comprises a bottom wall having a perimeter that is located interiorly of a series of sidewalk defined by the housing.

13. The power inlet assembly of claim 12, wherein the power inlet member is secured to the downwardly facing wall along with the one or more circuit breakers.

14. The power inlet assembly of claim 12, wherein the bottom wall is non-permanently interconnected with the series of sidewalls so that it can be selectively removable from and engaged with the series of sidewalls.

15. The power inlet assembly of claim 12, wherein the bottom wall s non-removably interconnected with the series of sidewalls.

16. A method of providing circuit protection to a power inlet assembly configured for securement to a structure, wherein the power inlet assembly includes a housing and a power inlet member that is configured to receive a power receptacle that enables power from a power source to be provided to the power inlet assembly, comprising the act of providing the housing with a bottom wall that has one or more circuit protection members secured thereto, wherein the one or more circuit protection members are electrically interconnected with the power inlet member.

17. The method of claim 16, wherein each circuit protection member includes an internal portion that is electrically connected with the power inlet member within an interior of the housing, and wherein each circuit protection member includes a reset member that comprises an external portion of the circuit protection member that is accessible from an exterior of the housing.

18. The method of claim 17, further comprising the act of positioning the circuit breaker reset members within a downwardly facing recess.

19. The method of claim 18, wherein the downwardly-facing recess is defined by the bottom wall in combination with lower portions of a series of sidewalls defined by the housing.

20. The method of claim 17, wherein the bottom wall defines a perimeter that is located interiorly of a series of sidewalls defined by the housing.

21. The method of claim 20, further comprising the act of removably engaging the bottom wall with the series of sidewalls.

22. The method of claim 20, further comprising the act of non-removably securing the bottom wall to the series of sidewalls.

23. The method of claim 20, further comprising the act of securing the power inlet member to the bottom wall along with the one or more circuit protection members.

* * * * *